United States Patent
Trejo

(10) Patent No.: US 8,066,469 B2
(45) Date of Patent: Nov. 29, 2011

(54) TRAY STACKING APPARATUS

(75) Inventor: Joaquin Alverde Trejo, Municipio de Metepec (MX)

(73) Assignee: Grupo Bimbo S.A.B. de C.V., Mexico City (MX)

( * ) Notice: Subject to any disclaimer, the term of this patent is extended or adjusted under 35 U.S.C. 154(b) by 356 days.

(21) Appl. No.: 12/286,700

(22) Filed: Oct. 1, 2008

(65) Prior Publication Data
US 2009/0092474 A1    Apr. 9, 2009

(30) Foreign Application Priority Data
Oct. 3, 2007    (MX) .................. MX/A/2007/012248

(51) Int. Cl.
*B65G 57/30* (2006.01)

(52) U.S. Cl. .................. 414/795.2; 414/794.7; 414/799; 414/927

(58) Field of Classification Search .................. 414/788, 414/788.2, 794.7, 794.9, 795.2, 795.3, 799, 414/923, 924, 927, 928
See application file for complete search history.

(56) References Cited

U.S. PATENT DOCUMENTS

| | | | | |
|---|---|---|---|---|
| 3,037,645 A * | 6/1962 | Simpkins | ................ | 414/789.9 |
| 3,458,058 A * | 7/1969 | Faerber | .................. | 414/790.3 |
| 3,765,546 A * | 10/1973 | Westerling | ................ | 414/795.2 |
| 3,844,423 A * | 10/1974 | Loomer et al. | ............. | 414/795.3 |
| 3,895,477 A * | 7/1975 | Yamashita | ................ | 414/788.7 |
| 3,934,736 A * | 1/1976 | Thomas | ................ | 414/790.7 |
| 4,082,194 A * | 4/1978 | Sheehan | .................. | 414/792 |
| 4,221,519 A * | 9/1980 | Nord et al. | ............... | 414/790.6 |
| 2006/0182545 A1 * | 8/2006 | Ray et al. | ............... | 414/226.01 |

FOREIGN PATENT DOCUMENTS

| | | | |
|---|---|---|---|
| EP | 194455 A2 | * | 9/1986 |
| JP | 60258027 A | * | 12/1985 |
| JP | 04159924 A | * | 6/1992 |

\* cited by examiner

*Primary Examiner* — Gregory Adams
(74) *Attorney, Agent, or Firm* — Brinks Hofer Gilson & Lione

(57) ABSTRACT

System and apparatus for automatically stacking trays involve receiving trays on a receiving platform, detecting the arrival of the tray on the platform, and synchronously displacing the tray to a moveable tray cart located in a tray stacking area of a stacking tower. An automated tray sliding mechanism displaces the tray to the stacking area upon detection of the tray at the receiving platform. Trays displaced in the stacking area of a lower section of a stacking tower form a tray stack. A stack elevator of the tower engages and elevates the tray stack providing a space beneath the stack allowing the next incoming tray to be displaced into the stacking area and assume the provided space beneath the tray stack, the incoming tray thereby assuming the lowermost position in the tray stack. Trays are added to the lowermost position in the stack until the stack height reaches a predetermined height and is removed from the stacking area.

12 Claims, 6 Drawing Sheets

TRAY STACKING APPARATUS

CLAIM OF PRIORITY

This application claims priority under 35 USC §119 to Mexican Patent Application Serial No. MX/a/2007/012248, filed on Oct. 3, 2007, the entire contents of which are hereby incorporated by reference.

TECHNICAL FIELD

This application discloses an apparatus and system to stack different configuration trays that may either contain or not contain products in a production chain, for their subsequent transportation as well as to reduce storage space.

BACKGROUND

Automated machinery and robotics have come to play an integral role in industry, allowing production lines to proceed more quickly, efficiently, and with increasing safety to laborers within the plant. Production line automation often results in machines assuming those steps that are either dangerous or too demanding for human workers, or that require repetitious routines.

Some automated plants utilize carriers to aid in transporting the plants products from one point in the production line to another. Trays, bowls, and boxes have been employed, carrying goods. The carriers have also doubled as packaging for manufactured goods passed into the marketplace. Food processing plants have also made use of such carriers, with such products as baked, frozen, and canned goods.

Some plants stack product carriers (or collectively "trays") at points within the production and delivery process. Automated stacking machinery exists that allows trays to be stacked from conveyor assembly to build a stack built from the top down—that is, new trays are added to the top of the stack, until the stack reaches a height nearing that of the conveyor. As the stack grows, conventional stacking machinery requires the conveyors and other stacking assemblies to be elevated off the ground to allow for the stack to be built in its downwardly, progressing orientation, beneath the assemblies. These elevated assemblies often make monitoring and maintenance of the stacking machinery difficult and expensive. Additionally, faults and breakdowns with conventional stacking machinery can result in stoppages to the entire assembly line, resulting in costly production delays, lost profit, and man-hours.

SUMMARY

Disclosed is an apparatus and system for stacking trays. An apparatus for stacking tray containing food product can include a tray receiving platform disposed at one end of a conveyor. The conveyor can deliver trays individually to the tray stacking apparatus. A tray sliding mechanism can be disposed above the tray receiving platform, adapted to displace a tray from the tray receiving platform into the tray stacking area. A sensor can be operably connected to the sliding mechanism wherein the sensor detects a tray received on the receiving platform from the tray conveyor and activates the tray sliding mechanism.

The apparatus can further include a tray stack cart with a tray transportation cart moveable along a track disposed in a direction of travel transverse to the conveyor direction of travel. The tray stack cart can allow the transportation cart to move under the tray receiving platform to a tray stacking area.

A stacking tower can be provided adjacent to the receiving platform. The stacking tower can include a support structure, a stack elevator movably mounted on the support structure, and a detecting mechanism operably connected to the stack elevator. The tray transportation cart can be moveably received into the tray stacking area in a lower portion of the tower. A tray sliding mechanism can displace incoming trays received at the platform into the tray stacking area of the lower portion of the stacking tower. When an incoming tray is detected in the stacking tower by the detecting mechanism, the stack elevator is activated and raises a prior received tray a predetermined height sufficient for the incoming tray to be received below the prior received tray positioned in the stacking tower. The stack elevator can create a tray stack with the incoming tray in the lowermost position.

In another aspect, an incoming tray is received from a production line onto a receiving platform, the arrival of the incoming tray on the receiving platform being detected. The incoming tray can be synchronously displaced across the receiving platform by a tray sliding mechanism upon detection of the incoming tray at the receiving platform. The tray can be displaced across the platform to a tray transportation cart positioned at a stacking area. A tray stack including at least one tray previously received in the stacking area can be synchronously engaged and elevated so that space is provided beneath the tray stack to allow the incoming tray to slide into the stacking area. The incoming tray can assume the provided space beneath the tray stack, thereby assuming the lowermost position in the tray stack. The steps of receiving individual incoming trays onto the platform and individually displacing them to the stacking area to assume the lowermost position in the tray stack can be repeated, the tray stack synchronously engaged and elevated with each repetition to provide space beneath the tray stack for the next incoming tray. These steps can be repeated until the tray stack reaches a predetermined tray stack height. When the tray stack height meets or exceeds the pre-determined height, the tray transportation cart supporting the tray stack can be removed from the stacking area.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
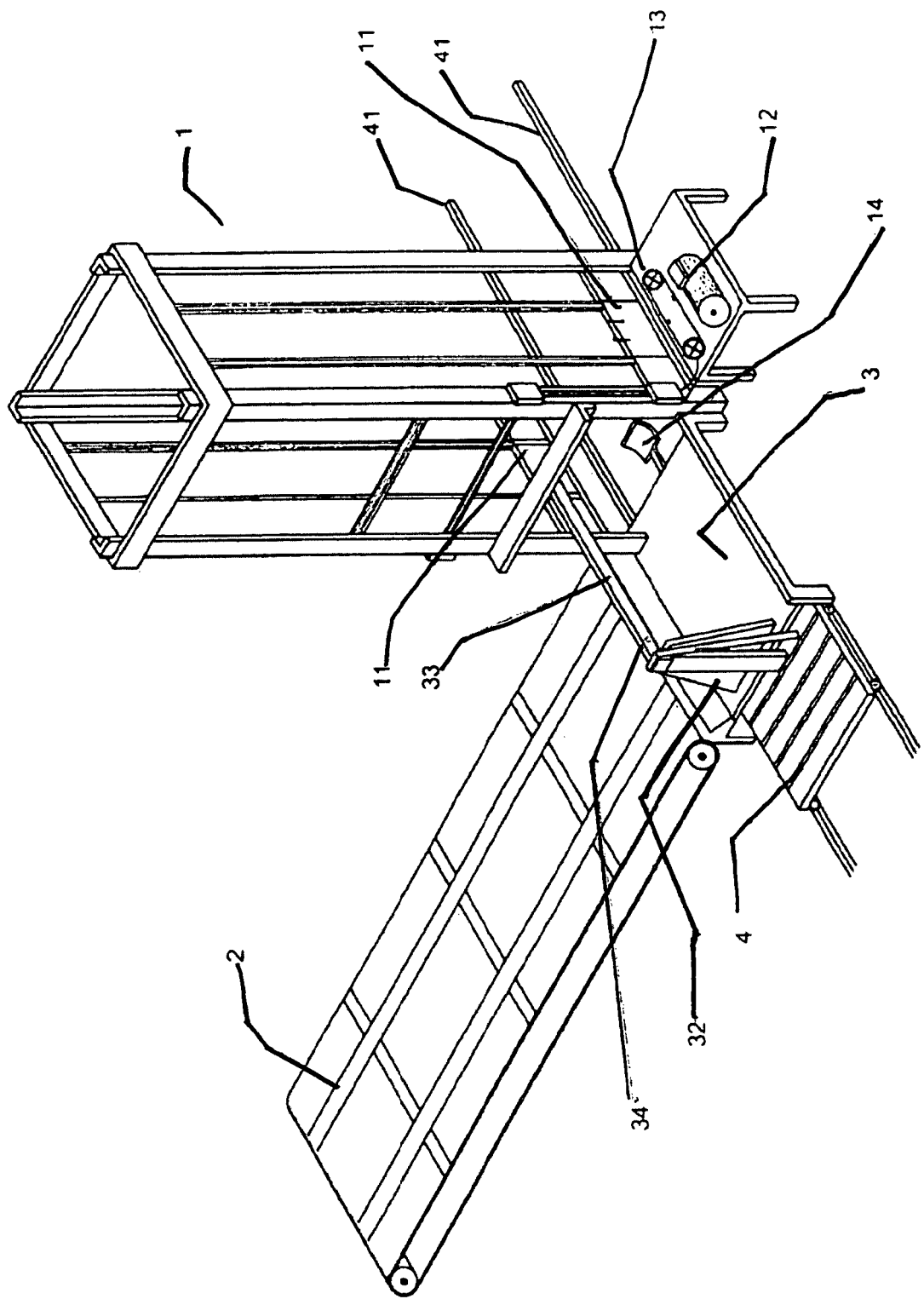
FIG. 1 is as a perspective view of a tray stacking apparatus.

One or more exemplary implementations of the present invention will be described below. Like reference numerals in the various figures refer to like parts.

Automated machinery and robotics can be employed to stack a plurality of trays containing food product. Conveyor apparatus can transfer the trays from one production area to a tray stacking area. Incoming trays can be stacked on a moveable cart, with the stack lifted to allow each incoming tray to occupy the lowermost position in the tower.

FIG. 1 illustrates one implementation of a tray stacking assembly and machine. A tray stacking tower 1 is positioned so as to receive trays arriving from a previous step in the assembly line. One or more conveyors 2 may be implemented in connection with the stacking assembly to transport trays to the stacking apparatus. The conveyor 2 can transport a tray to a tray receiving platform 3 prior to the tray being stacked in the stacking tower 1. The conveyor 2 may be an inclined slide conveyor, roller conveyor, skatewheel conveyor, or other inclined, gravity-driven conveyors. Some implementations may automate the conveyor, for example, through a motorized belt conveyor, similar to that illustrated in FIG. 1. In some implementation the receiving platform 3 is positioned lower than the level of the conveyor 2, with a ramp or other transition assembly provided to allow the tray to smoothly slide from the conveyor 2 onto the receiving platform 3. Some implementations may alternatively provide for the receiving platform 3 to be positioned level with the end of the conveyor 2 allowing trays to transition directly from the conveyor 2 to the receiving platform 3.

Trays received at the receiving platform 3 are to be passed to the stacking area. The stacking tower 1 is positioned in the stacking area, the perimeter of the stacking tower's 1 base defining the stacking area. The receiving platform 3 may be inclined so as to immediately convey the trays to the stacking area upon reception of the tray at the receiving platform 3. Alternatively, some implementations may provide for an automated sliding mechanism 32 positioned at the receiving platform 3 and capable of automatically pushing trays received at the receiving platform 3 to the stacking area. The sliding mechanism 32 may be, for example, a robotic arm that extends to slide across the receiving platform 3 toward the stacking area and stacking tower 1.

Figure 2:
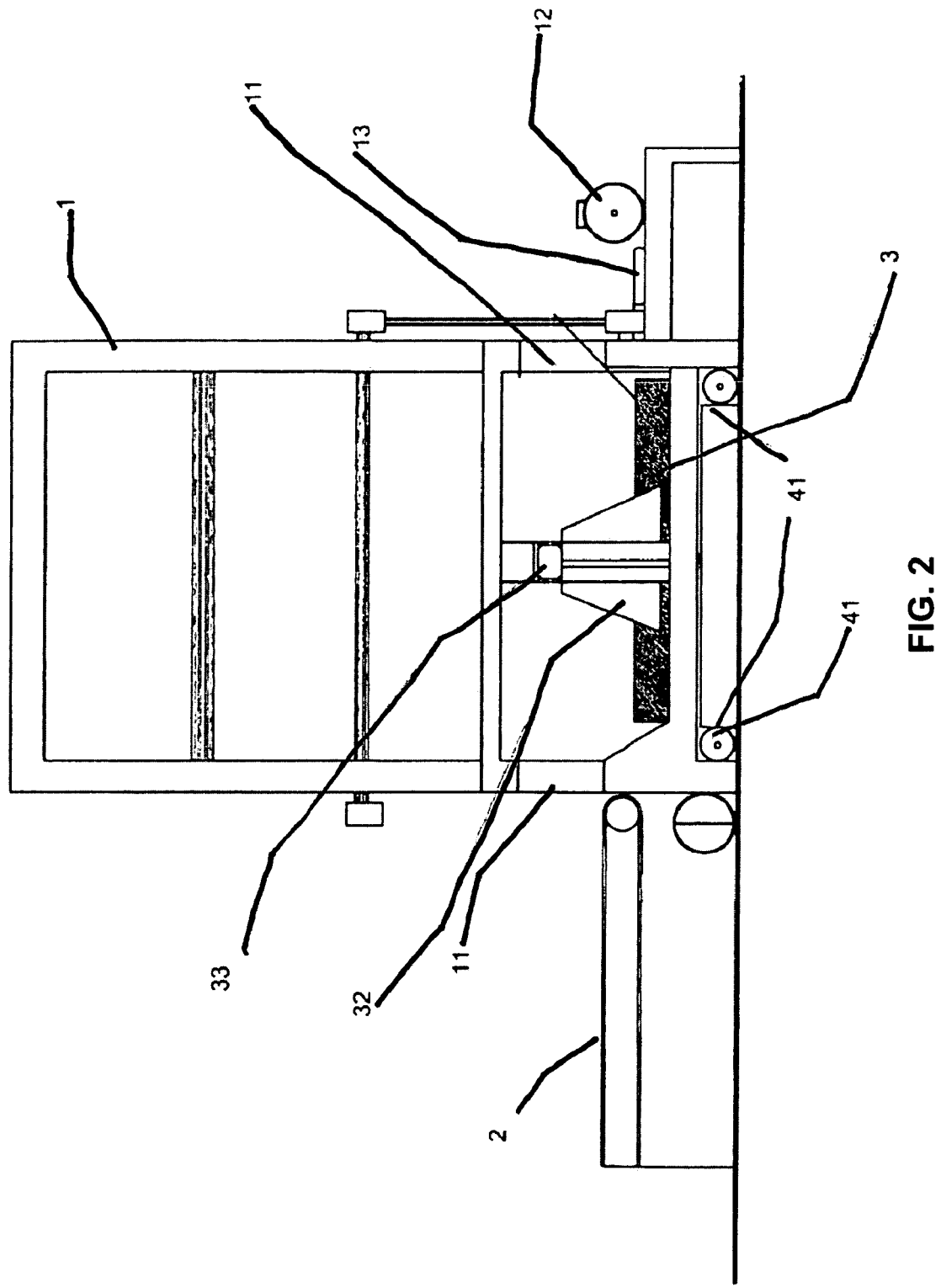
FIG. 2 is a front view of the tray stacking apparatus of FIG. 1.

FIG. 2 illustrates a front view of the tray stacking assembly and machine of FIG. 1. As made apparent in FIG. 2, some implementations of the automated sliding mechanism 32 may incorporate a guide rail 33 used to guide the sliding mechanism 32. The sliding mechanism 32 can move along a track provided by the guide rail 33 to direct the movement of the sliding mechanism 32 when pushing trays toward the stacking area. The guide rail 33 may be provided in connection with a robotic arm or similar machinery capable of pushing against a tray to guide the tray to the stacking area. Additionally, guides may be provided on the receiving platform 3 to guide the movement of the tray from the receiving platform 3 to the stacking tower 1. Returning to FIG. 1, the tray pushing function of the sliding mechanism 32 may be triggered by a sensor 34 provided on or near receiving platform 3 capable of detecting the presence of a tray at or near the receiving platform 3. For example, the sensor 34 may be an optical sensor, such as an infrared sensor, a mechanical sensor, such as a whisker or bumper sensor, or any other sensor capable of detecting the arrival of a tray at the receiving platform 3.

Trays arrive at the stacking tower 1 for stacking multiple trays in the stacking area. A tray transportation cart 4, such as a wheeled dolly or other cart, may be provided at the stacking tower 1, at least a portion of the cart 4 positioned within the stacking area. The cart 4 may roll along a track 41, guiding the cart to the stacking area. The track 41 may be provided so as to guide an empty cart beneath the receiving area 3 to the stacking area beneath the stacking tower 1. Providing a cart 4 as the base for the tray stack allows for the tray stack to be conveniently transported on the cart 4 and away from the stacking tower 1 upon completion of the stack. Additionally, if a failure were to occur at the stacking tower 1 or other assembly leading to or in the stacking area, such as a conveyor 2 providing trays to the tower 1, the stacking cart 4 could be moved away from the stacking tower 1 to a substitute tower, allowing trays bound for the original, malfunctioning stacking tower to be diverted to the substitute tower. Where the stacking tower 1 is the cause of the failure, some implementations may allow for the stacking tower 1 to be easily removed and replaced with a functioning stacking tower, to allow stacking to continue. The carts 4 can be automated, for example as a motor-driven, remote controlled cart. Some implementations may provide for the carts 4 to be dispatched to the stacking area through gravity, for example, on an inclined track the cart 4 stopping at the stacking tower 1. The cart 4 can be held at the tower 1 during stacking and released upon completion of a tray stack. The cart release can be automatic. Indeed, in some implementations, the stacking tower can be displaced from the stacking tower 1 by an automatic cart release 13 driven by a motor 12.

When an unloaded or partially-loaded tray cart 4 arrives at the stacking area, an additional sensor 14 may be provided to detect the cart's 4 arrival. The sensor 14 may be an optical, mechanical, or any other sensing device capable of signaling to the tray stacking apparatus that the cart 4 has been positioned at the stacking area and is ready to accept trays. A signal passed from the sensor 14 may also signal the presence of the tray to the sliding mechanism 32, so that trays are not pushed to the stacking area until a cart 4 is in position to receive the trays.

The stacking tower 1 can be provided with a stack builder 11 for automatically stacking trays arriving at the stacking area. The stack builder 11 can include a stack elevator capable of supporting the tray stack and lifting the stack so as to allow a tray arriving at the receiving platform 3 to be passed to the stacking area, sliding beneath the stack. The arriving tray is thereby allowed to assume the lowermost position of the stack. Lifting of the tray stack by the stack elevator can proceed synchronously with the arrival of new trays at the receiving platform 3, for example, as tray sensor 34 detects the arrival of an incoming tray. In some implementations, the stack builder 11 can be provided so as to reset the stack onto the arriving tray after the tray assumes the lowermost position in the stack, the stack builder 11 then lifting the stack from beneath the new, lowermost tray upon arrival of the next incoming tray.

The stack builder 11 can employ any mechanical device for supporting and elevating the tray stack. For example, the stack builder 11 can utilize a stack elevator employing wedges capable of sliding underneath two opposite sides of the lowermost tray in the stack, supporting the stack, and elevating the stack upward along a track fixed to and supported by the structure of the stacking tower 1. A sensor, such as tray sensor 34, can detect the arrival of a tray, triggering the elevation of the stack. Once the arriving tray takes its position in the stacking area beneath the elevated stack, the wedges can lower the tray stack to rest atop the newly-arrived tray. The wedges can then disengage the stack by, for example, automatically retracting away from the stack. For instance, in some implementations, the wedges can be pushed into a retracted position as the wedges descend on the track to lower the stack onto the lowermost tray. The wedges can then continue to descend, bringing the wedges into contact with the outside surfaces of the newly-arrived, lowermost tray, pushing the wedges back toward the stacking tower structure 1. The wedges can be equipped with springs or other mechanisms to automatically return the wedges to the unretracted position, once the elevator lowers the wedges into position beneath the new, lowermost tray, in preparation for the arrival of the next, incoming tray.

Some implementations may employ other apparatus to elevate and build the tray stack. For example, in some implementations, the apparatus employed by the stack builder 11 for elevating the stack will depend on the shape, orientation, and design of the trays themselves. For example, the trays could be provided with handles, troughs, or other receptacles adapted to engage with the orientation, function, and design of the stack builder device 11 provided on the stacking tower 1.

Figure 3:
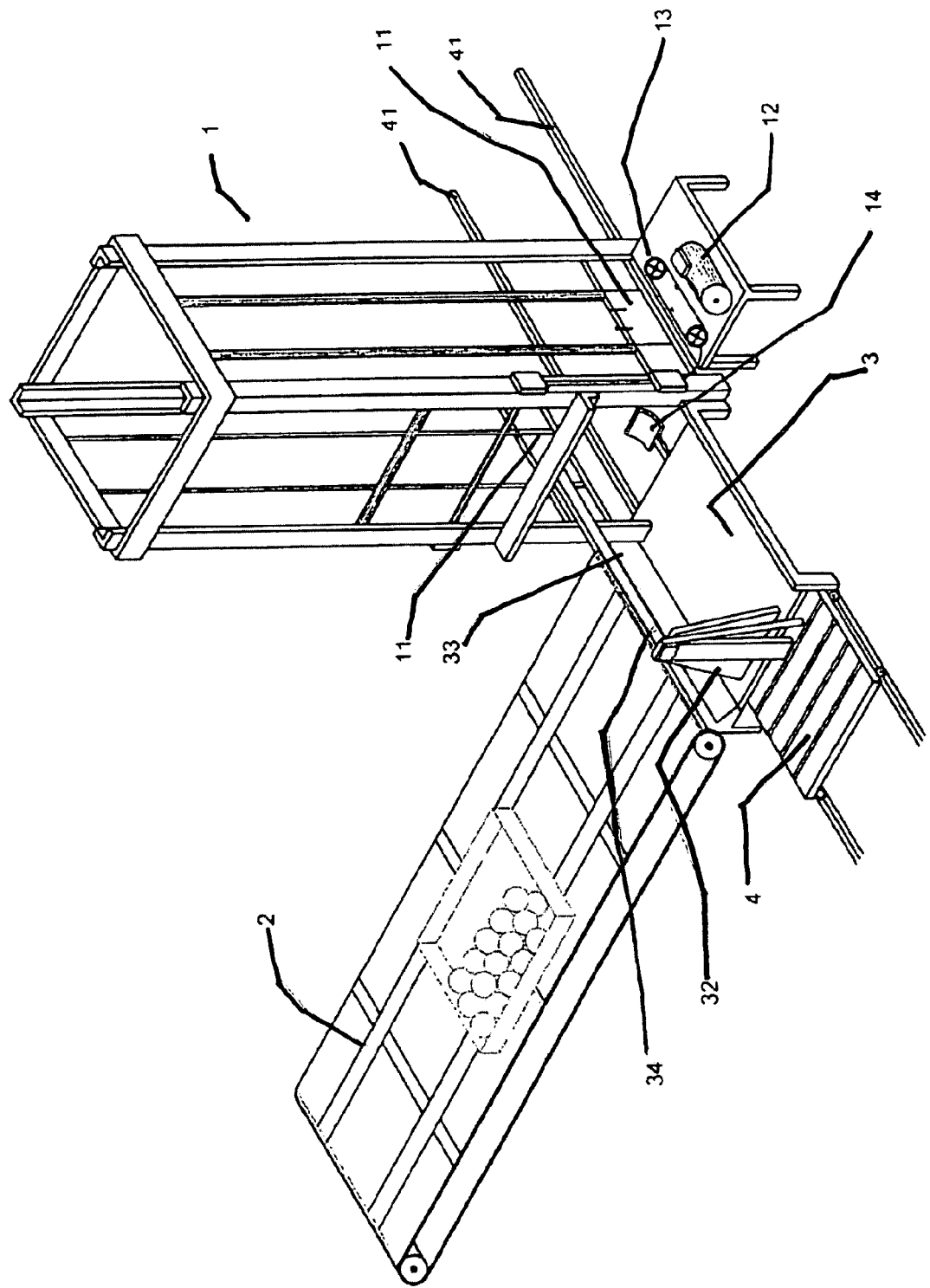
FIGS. 3-6 are perspective views of the tray stacking apparatus illustrating several stages of a technique for transporting and stacking trays.

FIGS. 3-6 illustrate perspective views of a tray stacking assembly and machine implementing progressive steps of a technique for transporting and stacking trays. FIG. 3 illustrates an example of a tray 6 being conveyed from one production area toward the stacking area of tray stacking apparatus. Given that no trays are yet stacked in the stacking area, the tray in FIG. 3 represents a first tray added to a tray. In this implementation, the tray contains products 5 produced or manufactured during a previous step in an assembly line. For example, the product 5 could be a food product, such as baked goods, ready to be stacked for eventual delivery into the marketplace, for example a bakery shop. The tray 6 can first be conveyed to a receiving platform 3 prior to entering the stacking area. Conveyance of the tray 6 may be carried out by a gravity-driven roller conveyor, a motorized belt conveyor, or any other conveyor device.

Figure 4:
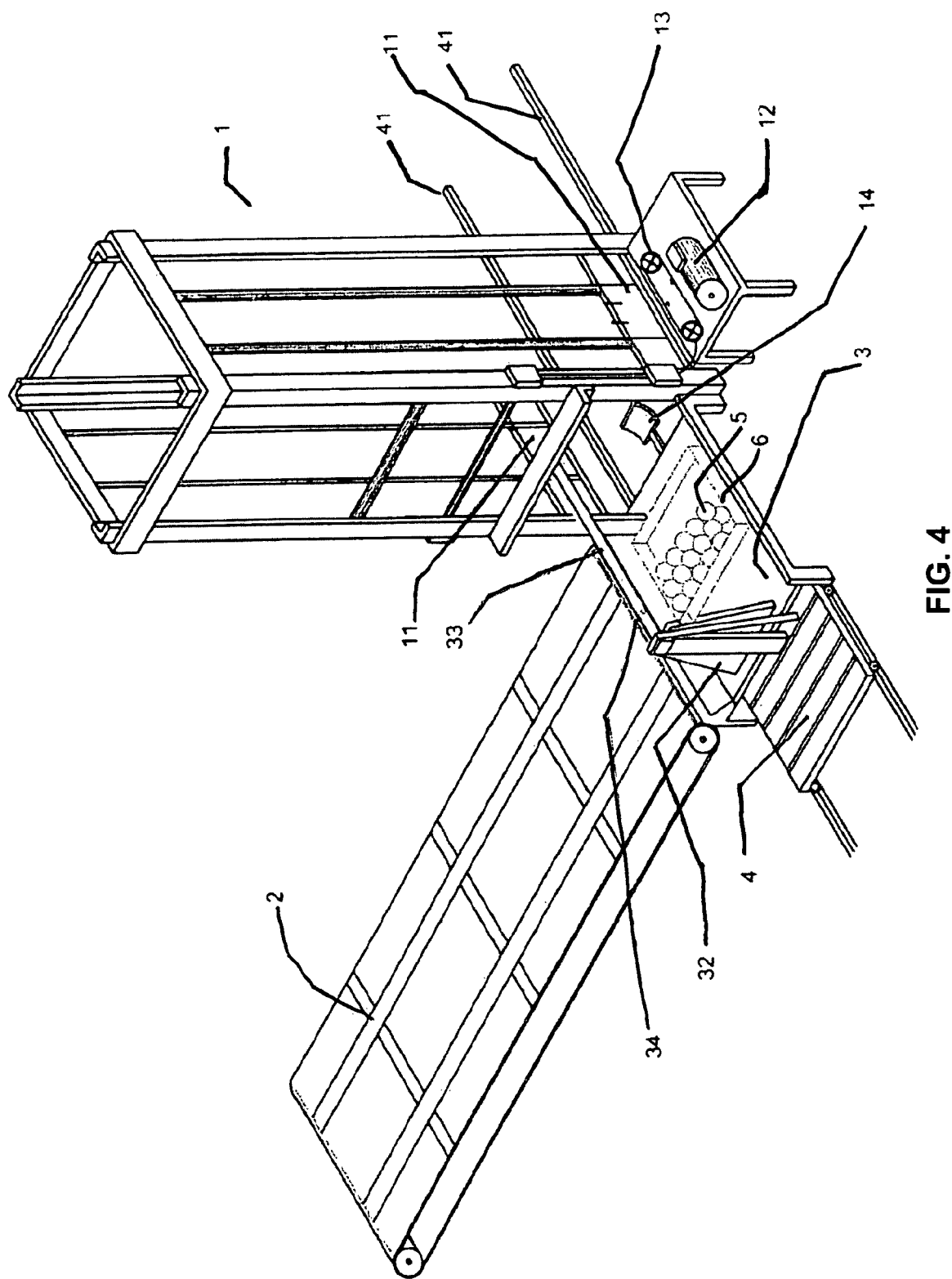
Figure 5:
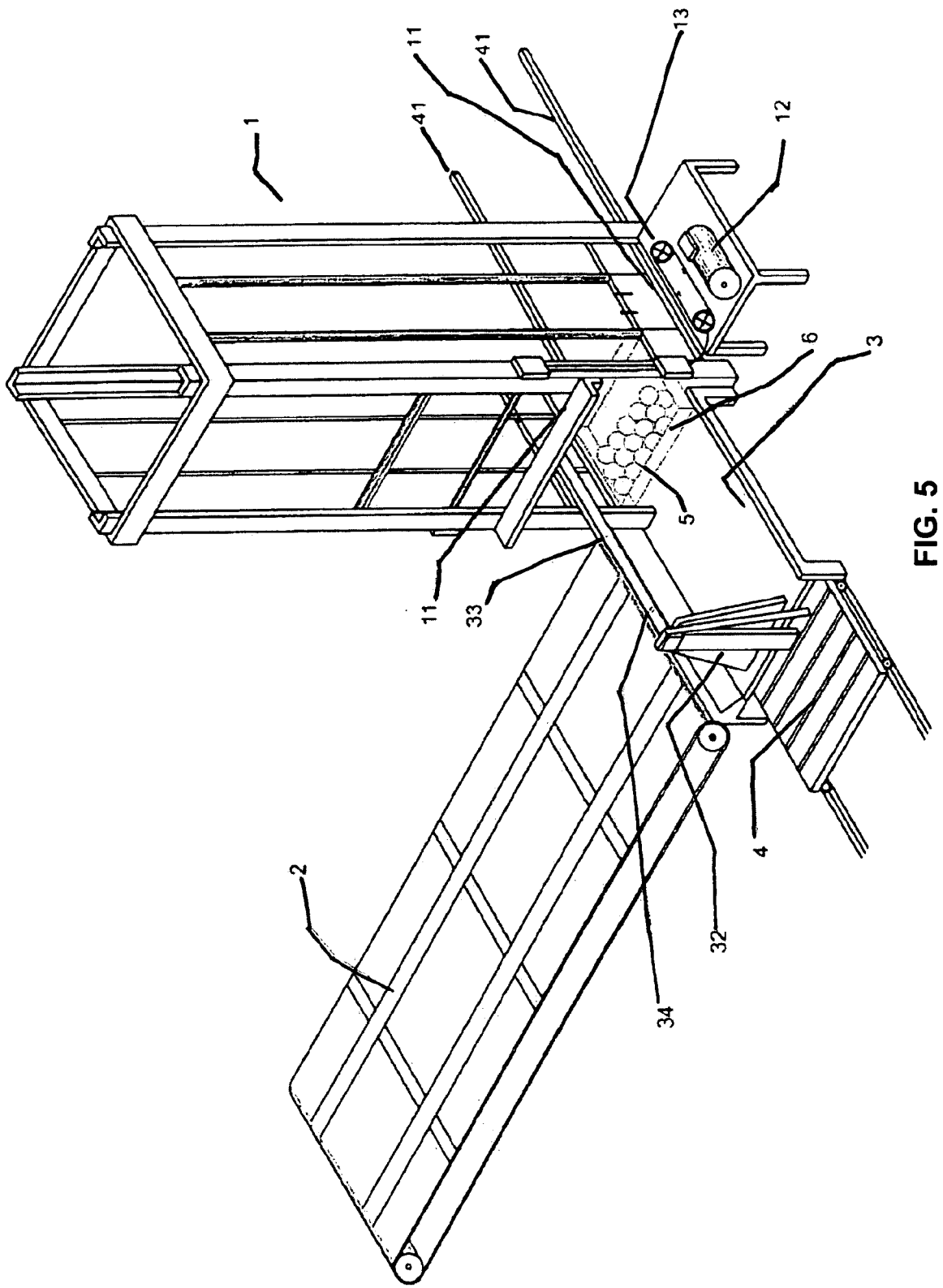

FIG. 4 illustrates a tray 6 having been transported by the conveyor 2 to the receiving platform 3. A sensor, such as the sensor 34, detects the arrival of the tray 6 at or near the receiving platform. The sensor may detect and signal the stacking system when the tray arrives and is positioned on the receiving platform, or may detect the tray as it reaches the end of the conveyor 2 or transitions from the conveyor 2 to the receiving platform 3. Upon detecting the arrival of the tray 6, the sliding mechanism 32 is activated to push the first, arriving tray into the stacking area, as illustrated in FIG. 5. A cart or carriage may be provided at the stacking area, the first arriving tray being supported by the cart within the stacking area.

Figure 6:
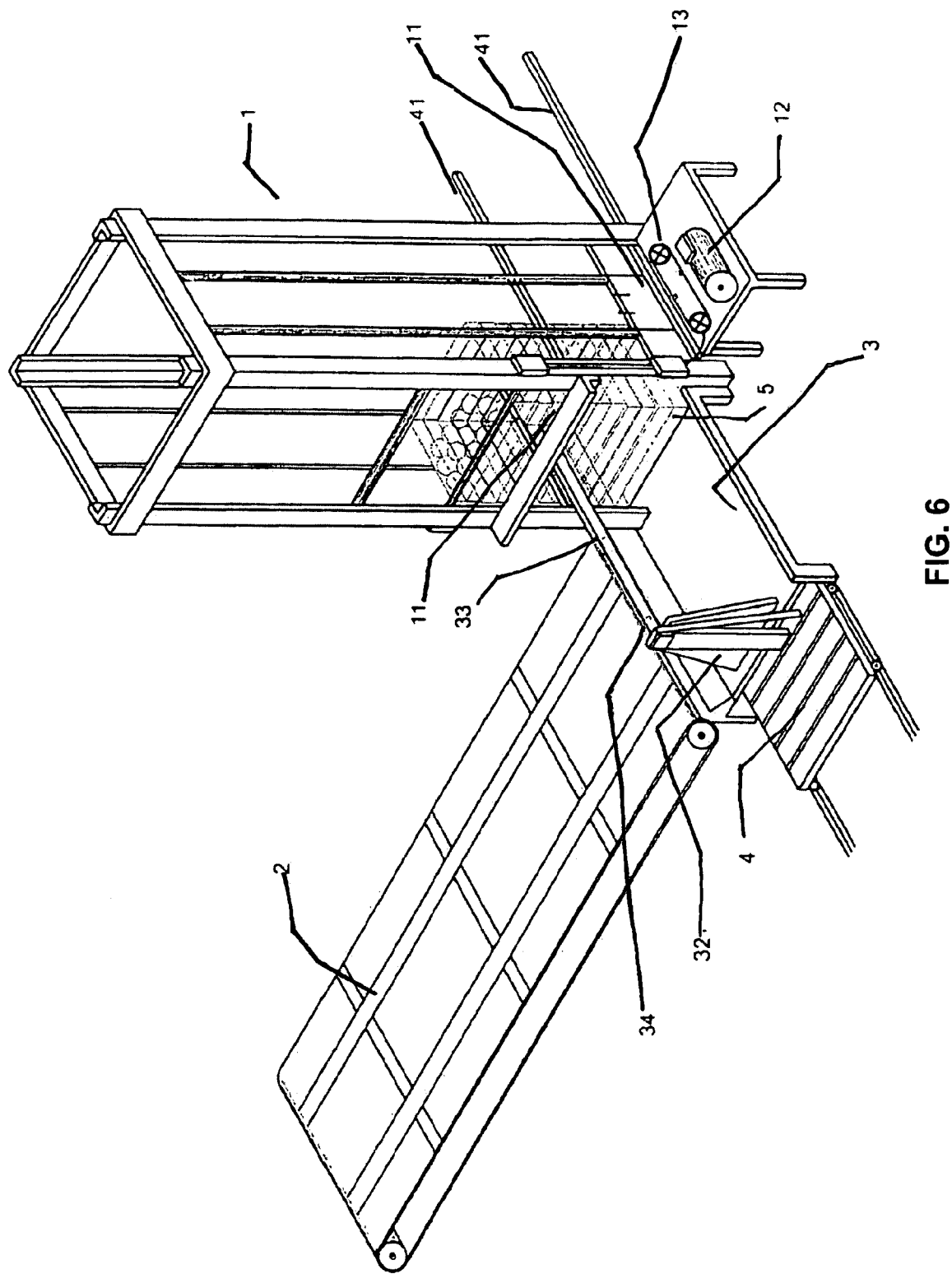

Having begun a tray stack in the stacking area, additional trays can then be added. FIG. 6 illustrates a tray stack having added a plurality of trays to the initial tray. The stack is built by receiving a second tray in addition to the first, arriving tray. The first tray, upon detection of the arrival of a second tray, is elevated to a height above the stack support positioned in the stacking area, such as the stack cart 4, allowing the second tray to be pushed beneath the first tray. The first tray assumes the uppermost position in the two tray stack, the second tray assuming the lowermost position. Under normal conditions, the first tray will always remain the uppermost tray in the developing stack. New, arriving trays will be added to the stack at the lowermost position in the stack. As each new tray arrives, the entire tray stack is elevated to allow the new tray to slide beneath the stack and assume the lowermost position in the stack. The stack can be elevated synchronously with the arrival of additional trays. The arrival of the trays can be detected by a sensor 34 capable of signaling the arrival of a new tray to the tray elevating device.

Elevation of the tray stack and acceptance of new arriving trays at the lowermost position in the stack is repeated until the tray stack reaches a predetermined height limit. The height limit may be established, for example, when a predetermined number of trays are receiving in the stack. The number of trays in the stack may be automatically determined by a counter operating in connection with the tray sensor 34. Some implementations may employ a height sensor, or similar device, to assess the height of the tray stack. Once the tray stack meets or exceeds the pre-determined height, the tray stack is to be removed from the stacking area. In some implementations, the tray stack may be secured to remain in the stacking area throughout the duration of the stack building steps. Once the stack reaches its predetermine height, the stack can be released allowing for the stack to be removed from the stacking area. In implementations utilizing a tray stack carriage to support the tray stack, the stack may be easily wheeled from the stacking area. Indeed, some implementations, the movement of the stack carriage may be automated, so as to allow for the stack carriage to move automatically from the stacking area.

Upon completion of a stack, a new stack may be begun. Stacking of the second tray stack proceeds just as before, until the second stack is completed. In some instances, there may not be enough trays to build a stack reaching the preset height limit. Accordingly, the tray stack can be removed from the stacking area, despite not reaching the height limit. Where a stack cart 4 is employed in the building of a stack, a second stack begins by moving a new stack cart into the stacking area to replace the departed stack cart carrying the previously, completed stack. The conveyance of a new stack cart to the stacking area may proceed automatically. In some implementations, the new stack cart may be moved into the stacking area synchronously with the detection of an on-coming tray. Some implementations may hold a tray on the receiving platform until the presence of a stack cart is detected in the stacking area, for example by a sensor or other detector 14.

A number of embodiments of the invention have been illustrated in the accompanying drawings and described in the Detailed Description. It will be understood that the invention is not limited to the embodiments and implementations disclosed, but is capable of numerous modifications without departing from the scope of the invention as claimed.

What is claimed is:

1. A tray stacking apparatus for a plurality of trays containing food product, said trays individually delivered to the apparatus by a tray conveyor delivering trays in a first direction of travel, said tray stacking apparatus comprising:

a tray receiving platform disposed at a first end of the conveyor, said platform adapted to receive an incoming tray from the tray conveyor;

a tray sliding mechanism disposed above the tray receiving platform, said tray sliding mechanism adapted to displace a tray from the tray receiving platform into the tray stacking area of the lower portion of the stacking tower, the tray sliding mechanism comprising a slider guide rail, where the tray slider device engages the slider guide rail and pushes the tray along a path directed toward the stacking area, the path corresponding to the orientation of the slider guide rail;

a sensor operably connected to the tray sliding mechanism wherein the sensor detects a tray received on the receiving platform from the tray conveyor and activates the tray sliding mechanism; and a tray stack carriage including:
    a tray transportation cart movable along a track disposed in a second direction of travel being transverse to said first direction of travel, said tray carriage adapted to allow the tray transportation cart to move under the tray receiving platform and into a tray stacking area;
    a stacking tower disposed adjacent to the receiving platform, said stacking tower adapted to allow the tray transportation cart to be movably received into the tray stacking area located in a lower portion of the tower, said tower including
        a support structure, a stack elevator movably mounted on the support structure, a detecting mechanism operably connected to the stack elevator;

wherein when an incoming tray is detected in the stacking tower the stack elevator is activated and raises a prior received tray a predetermined height sufficient for the incoming tray to be received below the prior received tray positioned in the stacking tower, thereby creating a tray stack with the incoming tray in the lowermost position.

2. The tray stacking apparatus of claim 1, the tray sliding device comprising a robotic arm adapted to extend and thereby displace the incoming tray across an upper surface of the receiving platform in a motion directed toward the stacking area.

3. The tray stacking apparatus of claim 1, the stack elevator further adapted to further engage and elevate the tray stack so as to allow the stacking tower to accept additional incoming trays at the lowermost position in the tray stack until the tray stack meets or exceeds a predetermined stack height.

4. The tray stacking apparatus of claim 3, where the stacking tower further comprises a cart release adapted to automatically release the transportation cart when the tray stack meets or exceeds the predetermined stack height, thereby allowing the transfer of the tray transportation cart with the tray stack away from the stacking area.

5. The tray stacking apparatus of claim 1, where the tray transportation cart is adapted to move into a stacking area of the stacking tower synchronously with the reception of a first incoming tray by the tray receiving platform.

6. The tray stacking apparatus of claim 1, the stacking tower comprising at least four vertical support members adapted to define a horizontal perimeter of the tray stacking area and support the stack elevator.

7. The tray stacking apparatus of claim 1 wherein the detecting mechanism comprises an optical detector.

8. A method for stacking trays containing a food product, the method comprising:

1) receiving an incoming tray from a production line onto a receiving platform;

2) providing a tray sliding mechanism with a slider guide rail disposed above the tray receiving platform;

3) providing a sensor operably connected to the sliding mechanism and detecting with the sensor a tray received on the receiving platform;

4) activating the tray sliding mechanism to displace the incoming tray across the receiving platform to a tray transportation cart positioned at a tray stacking area of a lower portion of a stacking tower and pushing the tray into the stray stacking area;

5) asynchronously engaging and elevating a tray stack positioned in the stacking area upon detection of the incoming tray at the receiving platform, the tray stack comprising at least one tray previously received in the stacking area, the tray stack elevated so that space is provided beneath the tray stack to allow the incoming tray to slide into the stacking area and assume the provided space beneath the tray stack, thereby assuming the lowermost position in the tray stack;

6) repeating steps 1-4 thereby adding additional incoming trays to the tray stack at the lowermost position of the tray stack until the height of the tray stack meets or exceeds a pre-determined height; and 7) removing the tray transportation cart supporting the tray stack from the stacking area when the tray stack height meets or exceeds the pre-determined height.

9. The method of claim 8 further comprising:

detecting the presence of the tray stack carriage within the stacking area, where the incoming tray is synchronously displaced across the receiving platform and the tray stack synchronously engaged and elevated with the detection of the presence of the tray transportation cart in the stacking area.

10. The method of claim 8 further comprising:

identifying a set of trays, the set comprising a plurality of trays;

repeating steps 1-6 until all trays in the set of trays are in a tray stack.

11. The method of claim 8 further comprising:

detecting a failure of equipment responsible for performing step 4; and replacing the failed equipment with replacement equipment capable of performing step 4.

12. The method of claim 8, where the tray stack is removed automatically from the stacking area.

* * * * *